No. 738,427. PATENTED SEPT. 8, 1903.
O. P. FRITCHLE.
PROCESS OF PRODUCING ACTIVE MATERIAL AND ELECTRODES FOR STORAGE BATTERIES AND PRODUCT THEREOF.
APPLICATION FILED MAR. 18, 1903.
NO MODEL.

Witnesses:
R. A. Balderson.
Harry C. Robb.

Inventor:
Oliver P. Fritchle,
By Byrnes & Townsend,
Att'ys.

No. 738,427.

Patented September 8, 1903.

UNITED STATES PATENT OFFICE.

OLIVER P. FRITCHLE, OF DENVER, COLORADO.

PROCESS OF PRODUCING ACTIVE MATERIAL AND ELECTRODES FOR STORAGE BATTERIES AND PRODUCT THEREOF.

SPECIFICATION forming part of Letters Patent No. 738,427, dated September 8, 1903.

Application filed March 18, 1903. Serial No. 148,375. (No specimens.)

*To all whom it may concern:*

Be it known that I, OLIVER P. FRITCHLE, a citizen of the United States, residing at Denver, in the county of Denver and State of Colorado, have invented certain new and useful Improvements in Processes of Producing Active Material and Electrodes for Lead Storage Batteries and Product Thereof, of which the following is a specification.

This invention relates to the production of a crystalline non-disintegrating active material of the utmost electrical conductivity and molecular porosity, which will allow the freest possible diffusion of the electrolyte on charge and discharge. The new active material may either be compressed into a self-supporting electrode or may be carried by a suitable support or grid.

The invention is based on the discovery that particles of finely-divided lead, especially when produced by spraying molten lead by means of a blast, obtain a peculiar cohesive property, like that possessed by crystals of lead freshly deposited by electrolysis, when subjected to the action of a cleaning solution—such as a hot dilute solution of hydrochloric, acetic, or nitric acid or one of sodium or potassium hydroxid—and may then be welded together into a rigid but highly porous mass by subjecting them to light pressure. The treatment with the acid or other solution causes a slight evolution of gas, which prevents the particles of lead from settling into a dense compact mass.

The process may be carried out by the use of any suitable apparatus. An apparatus which has been employed with advantage is shown in the accompanying drawings, in which—

Figure 1:
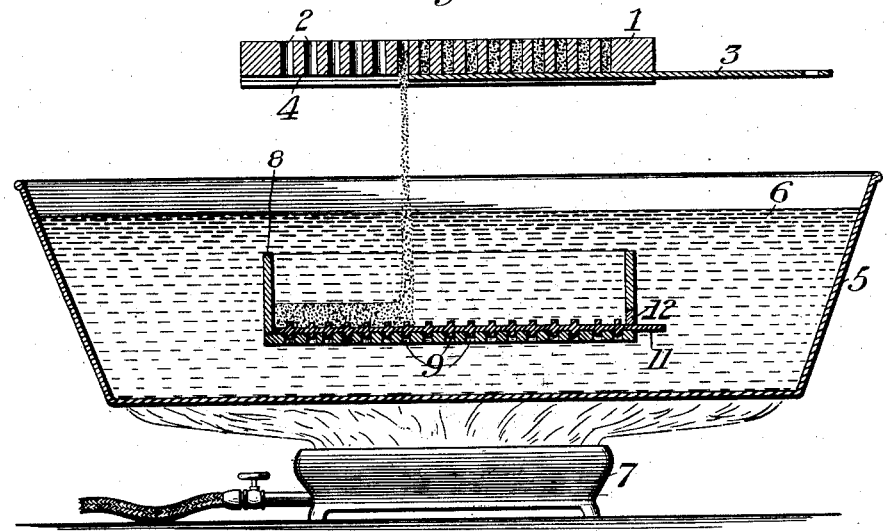
Figure 2:
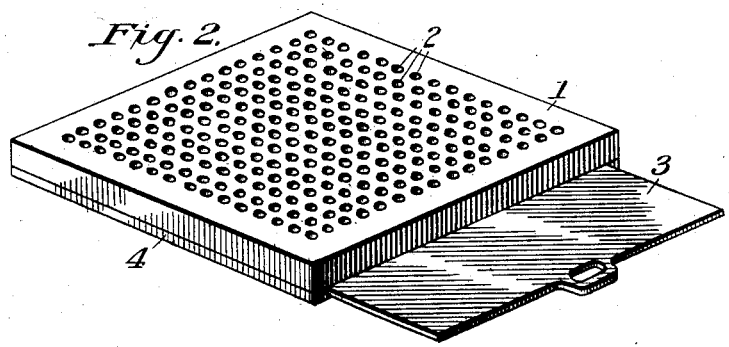
Figure 3:
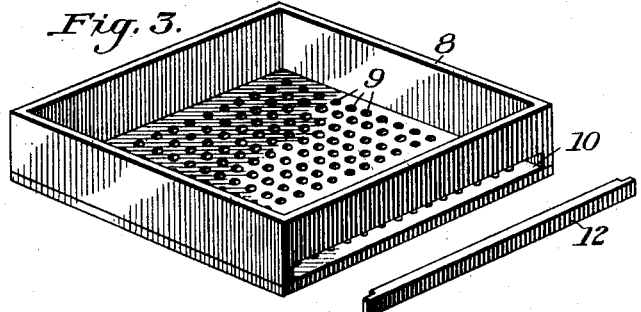

Figure 1 is a transverse vertical section of the entire apparatus. Fig. 2 is a perspective view of a device for holding the finely-divided lead and showering it evenly into the hot solution, and Fig. 3 is a perspective view of a device for receiving the showered lead after treatment and which is also arranged to hold a grid or other support for the treated lead.

The apparatus comprises a device 1 for holding and showering the finely-divided lead. This device is a rectangular plate, which may be of wood, having a large number of perforations or slots 2 extending entirely through it. A slide 3 is arranged to move in contact with the lower surface of the plate and is supported by rabbeted parallel guide-strips 4, secured beneath the edges of the plate. A vessel 5, which may be a shallow porcelain-lined pan, contains a body of the cleaning solution 6, which may be a five-per-cent. aqueous solution of hydrochloric, acetic, or nitric acid or a solution of sodium or potassium hydroxid. Beneath the pan is a gas-heater 7, by which the acid solution is brought to a high temperature. A receiver 8 is supported within the pan at some distance above its bottom and directly beneath the showering device 1. The receiver is a shallow rectangular tray of material which is inert toward the solution, such as copper. The bottom of this receiver is detachable and has a large number of perforations 9, adapted to receive projections on a grid, allowing the body of the grid to lie flat on the bottom of the receiver. A horizontal slot 10 is cut through one wall of the receiver at or slightly above the inner surface of its bottom, through which may be inserted a grid or plate 11 to receive the treated lead. A strip 12 closes the slot. In employing this apparatus to carry out the process the receiver 8, containing the grid 11, is placed in the pan 5 and the solution is heated to a high temperature, preferably to its boiling-point. The apertures in plate 1 are filled with the granulated lead, previously sieved to a size between sixty and one hundred mesh, the slide being closed, and the device is placed directly above the receiver 8, as shown in Fig. 1. The slide is now slowly withdrawn and the lead falls through the hot solution into the receiver and onto the grid 11. The action of the solution on the granulated lead quickly causes it to become coherent, as if in a molten state, and when hydrochloric acid is used the treated mass will occupy about four times the original volume of the lead. The lead is now compressed to about twice its original volume, preferably while it is still within the hot solution. It is important that the treated lead should be compressed without delay, as its property of welding is soon destroyed by the continued action of some cleaning solutions, such as hydrochloric acid. The pressure required is comparatively slight, depending upon the required porosity of the mass, and may be effected by a hand-press with screw and toggle mechanism. The bottom of the receiver is now detached and the grid with the compressed active material on one of its faces is pushed out and again inserted with the coating of active material below. The bottom is replaced and the other face of the grid is provided with a coating of active material by repeating the described operations.

While the use of a conducting or non-conducting grid or support is often desirable, this element is not essential. The granulated lead after passing through the solution may be received directly on the bottom of any suitable vessel and compressed into a highly porous and self-supporting electrode of sufficient rigidity for practical use. While the process is preferably carried out by the use of one of the described solutions, a solution of any other acid, alkali, salt, or compound which will clean the surface of the lead particles by dissolving or reducing the coating of oxid or otherwise producing a clean metallic surface may be employed. The use of lead which has been granulated by a blast is preferable, as the shreds and filaments interlace when the treated mass is compressed, giving the body greater firmness and rigidity. I obtain by my process an electrode possessing all the good qualities of a Planté plate, with the high capacity of a Faure plate.

Heretofore most attempts at producing porous coherent acting material or material to become active for storage batteries have been by combining the lead or compounds of lead with some foreign element and then dissolving out the foreign element after the electrode has been shaped, leaving the mass in a semi-adherent state, easily disintegrated by the action of the current on charge and discharge. A few attempts have been made to weld the particles of lead together by collecting them unsized when in the molten or semi-molten state, but the forming of blow-holes throughout the mass cannot be avoided, while in my method it is apparent that not a single particle of the lead can be shut off from the action of the electrolyte from the fact that each particle is surrounded by gas or liquid from the beginning, and this must partially escape from the interstices of the mass upon applying the pressure in welding. I am also aware that electrolytically-deposited crystals of lead have been compressed into a coherent mass for storage-battery electrodes; but the crystals of deposited lead are so minute—almost molecular—that after compression the interstices or pores in the compressed mass are correspondingly small, and on account of the slow diffusion of the electrolyte they soon become clogged by the insoluble sulfate, whereas in the active material formed by my process the pores are much larger, allowing a rapid circulation of the electrolyte and the washing out of any detached particles of sulfate. The electrode produced by this process may be formed by any suitable method.

The apparatus shown and described herein is claimed in my application, Serial No. 138,168, filed January 7, 1903.

The use of chlorin or a compound which will yield chlorin, especially a hot dilute solution of hydrochloric acid, is not claimed specifically herein, but constitutes the subject-matter of my application, Serial No. 138,167, filed January 7, 1903.

While it is generally desirable or necessary to subject the particles of lead to the action of a cleaning solution, a satisfactory electrode may also be produced by allowing the finely-divided lead which has been sprayed by a blast to cool, collecting it into a body before the particles have lost their cohesive property—that is, before the surfaces have become oxidized—and compressing the body.

I claim—

1. The process of producing active material for lead storage batteries, which consists in subjecting finely-divided lead to the action of a cleaning solution, and then compressing the treated lead into a coherent, porous mass, as set forth.

2. The process of producing active material for lead storage batteries, which consists in subjecting finely-divided lead to the action of a hot cleaning solution, and then compressing the treated lead into a coherent, porous mass, as set forth.

3. The process of producing active material for lead storage batteries, which consists in showering finely-divided lead into a hot cleaning solution, and then compressing the treated lead into a coherent, porous mass, as set forth.

4. The process of producing active material for lead storage batteries, which consists in spraying molten lead by a blast, subjecting the finely-divided lead to the action of a cleaning solution, and compressing the treated lead into a coherent, porous mass, as set forth.

5. The process of producing active material for lead storage batteries, which consists in spraying molten lead by a blast, showering the finely-divided lead into a hot cleaning solution, and then compressing the treated lead into a coherent, porous mass, as set forth.

6. The process of producing electrodes for lead storage batteries, which consists in applying granulated lead to a support and subjecting it to the action of a cleaning solution, and then compressing the treated lead into a coherent, porous mass, as set forth.

7. The process of producing electrodes for lead storage batteries, which consists in applying granulated lead to a support and subjecting it to the action of a hot cleaning solution, and then compressing the treated lead into a coherent, porous mass, as set forth.

8. The process of producing electrodes for lead storage batteries, which consists in showering granulated lead through a hot cleaning solution onto a support, and then compressing the treated lead into a coherent, porous mass, as set forth.

9. Active material for lead storage batteries, produced by subjecting granulated lead to the action of a cleaning solution and then compressing the treated lead into a coherent, porous mass, as set forth.

10. Active material for lead storage batteries, produced by showering granulated lead through a hot cleaning solution and then compressing the treated lead into a coherent, porous mass, as set forth.

11. An electrode for lead storage batteries, comprising a support, and active material produced by subjecting granulated lead to the action of a cleaning solution and then compressing the treated lead into a coherent, porous mass, as set forth.

12. An electrode for lead storage batteries, produced by showering granulated lead through a hot cleaning solution onto a support and then compressing the treated lead into a coherent, porous mass, as set forth.

In testimony whereof I affix my signature in presence of two witnesses.

OLIVER P. FRITCHLE.

Witnesses:
JOHN B. COOKE,
FRED G. HANSEN.